Figure 1:
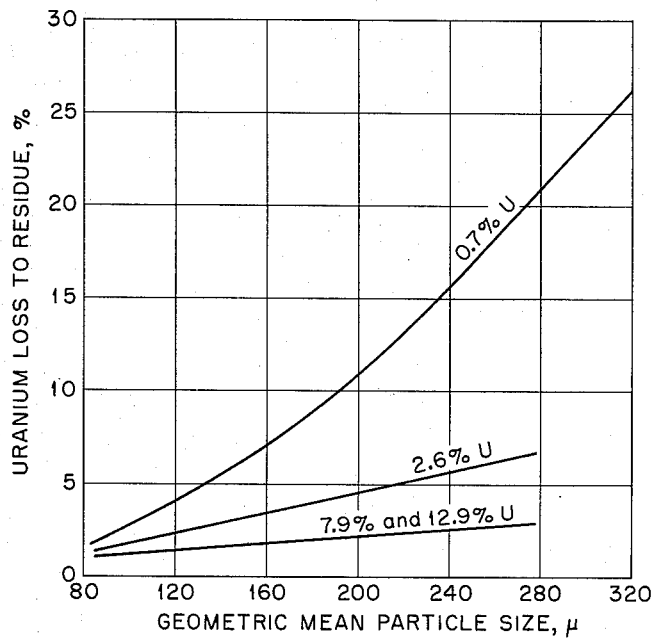

INVENTORS.
Mildred J. Bradley
Leslie M. Ferris
BY

ATTORNEY.

INVENTORS.
Leslie M. Ferris
BY Mildred J. Bradley

ATTORNEY from 0.63 to 13 percent uranium by weight is shown in Table I below.

*Table I*

| Fuel Composition, percent U | Uranium Recovered, percent | | | | | |
|---|---|---|---|---|---|---|
| | 90% HNO₃ᵃ 1st leach + 2 water washes | 3rd water wash | 90% HNO₃ᵃ | | 70% HNO₃ᵃ | |
| | | | 2nd leach + 1 wash | Graphite residue | 2nd leach + 1 wash | Graphite residue |
| 0 b | No disintegration | | | | | |
| 2.71 c | No disintegration: 12 c | 0 | | | 15 | 73 |
| 8.0 d | No disintegration | | | | | |
| 0.63 | 91.6 | 0.02 | 4.0 | 4.4 | 3.6 | 4.9 |
| 0.70 | 89.1 | 0.1 | 8.4 | 2.3 | 7.4 | 2.5 |
| 2.53 | 96.8 | 0.2 | 2.5 | 0.5 | 1.9 | 1.1 |
| 5.41 | 98.1 | 0.2 | 1.6 | 0.15 | 1.3 | 0.35 |
| 8.03 | 98.2 | 0.1 | 1.6 | 0.08 | 1.4 | 0.34 |
| 10.2 | 98.4 | 0.1 | 1.4 | 0.05 | 1.2 | 0.33 |
| 13.0 | 99.0 | 0.1 | 0.8 | 0.06 | 0.7 | 0.20 |

ᵃ Boiling solution used in each leach.
ᵇ Graphite base was immersed in boiling 90% (21.2M) HNO₃.
ᶜ This fuel was immersed in boiling 15.8M HNO₃.
ᵈ 8% UO₂-graphite fuel in boiling 19M HNO₃.

The twofold advantage of simultaneous disintegration and quantitative uranium leaching achieved by using the required nitric acid concentration is observed from the above data.

EXAMPLE II

A number of graphite fuel samples were prepared by mixing powdered uranium dioxide with graphite flour and a liquid organic binder, hot pressing to a desired shape, removing the binder by baking at a temperature in the range 1000° C. to 1400° C. in an inert atmosphere, reimpregnating with binder and finally sintering the formed compact at a temperature in the range 2400° C. to 2800° C. Each compact was digested for four hours in a boiling nitric acid solution containing a nitric acid molarity as indicated in Table II below. The resultant solution was removed by filtration and the residual solids washed with water. The residual solids were then dried and sieved to determine the particle size distribution. The solution and combined solids were then analyzed separately to determine uranium content of each. The sample digested with 19.2 molar nitric acid showed no measurable disintegration, i.e., it did not exfoliate to powder, whereas those samples digested with solutions with nitric acid concentrations of at least 20 molar or greater were completely disintegrated to powder having a geometric mean size as given in the following table.

*Table II*

| HNO₃ Conc., (M) | Geometric Mean Particle Size of Powdered Residue (microns) | Uranium Recovered by Leach (percent) |
|---|---|---|
| 19.2 | No disintegration* | 56 |
| 20.1 | 950 | 98 |
| 21.2 | 252 | 99 |
| 21.7 | 163 | 98 |
| 23.9 | 108 | 97 |

*Only a slight surface erosion of the treated compact.

EXAMPLE III

Three groups of graphitized uranium-graphite fuel were prepared in accordance with the procedure described in Example II to form compacts having the dimensions 1.2 x 1.4 x 4.5 centimeters. The first group contained 0.7 percent uranium, the second group contained 2.5 percent uranium, and the third group contained 5 percent uranium.

Half of the compacts in each group were leached first with 50 milliliters of boiling 15.8-molar nitric acid for four hours and then leached with a 25-milliliter portion of boiling acid for four hours. The surface of the specimens was washed with water after each leach. After two successive leaches, only 30 percent of the uranium in the 0.7% uranium-graphite fuel, 28 percent in the 2.5% fuel and about 45 percent in the 5% fuel had been recovered from the leach solutions. No visible disintegration of these compacts was observed. By comparison, the remaining compacts were simultaneously disintegrated and leached with boiling 21.2 M (90% HNO₃) nitric acid. The leach solutions were separated from the disintegrated solids and analyzed for uranium. The analytical results indicated that after two leaches with 21.5 M nitric acid, 97 percent of the uranium was recovered from the compacts containing 0.7 percent uranium, that 99.5 percent of the uranium was recovered from the compacts containing 2.5 percent uranium, and that 99.85 percent of the uranium was recovered from the compacts containing 5 percent uranium.

EXAMPLE IV

A particularly useful and advantageous characteristic feature of this invention is illustrated in this example in which is demonstrated that a significant degree of decontamination of fission product activity, particularly of the long-lived fission product isotopes, is effected by chemical disintegration of the graphite fuel.

Graphite-uranium fuel specimens consisting of a relatively uniform dispersion of uranium carbide within a graphite matrix were exposed to a neutron flux of a going nuclear reactor until 0.001% burnup had been achieved. The resultant radioactive fission-product-containing samples were removed from the reactor and treated in accordance with the procedure described in Example I. The disintegrated graphite residue from each sample was then analyzed for zirconium-95, ruthenium-106, cesium-137, and cerium-144. The results are shown in Table III below.

*Table III*

| Run No. | U in Fuel¹ Percent | Leach Conditions² | | Amount of Element in Graphite Residue, Percent | | | | |
|---|---|---|---|---|---|---|---|---|
| | | Temp., °C. | Time, Hrs. | U | Zr-95 | Ru-106 | Cs-137 | Ce-144 |
| 1 | 3 | 93 | 4 | 0.62 | 40.0 | 36.0 | 31.4 | 62.1 |
| 2 | 12 | 93 | 4 | 0.03 | 59.5 | 36.7 | 21.1 | 61.3 |

¹ Nominal composition.
² Two successive leaches each followed by water-washing of the residue.

It will be seen that a significant amount of the long-lived fission product isotopes were retained within the chemically disintegrated fuel graphite matrix while only a nominal percentage of the original uranium content was retained.

Figure 2:
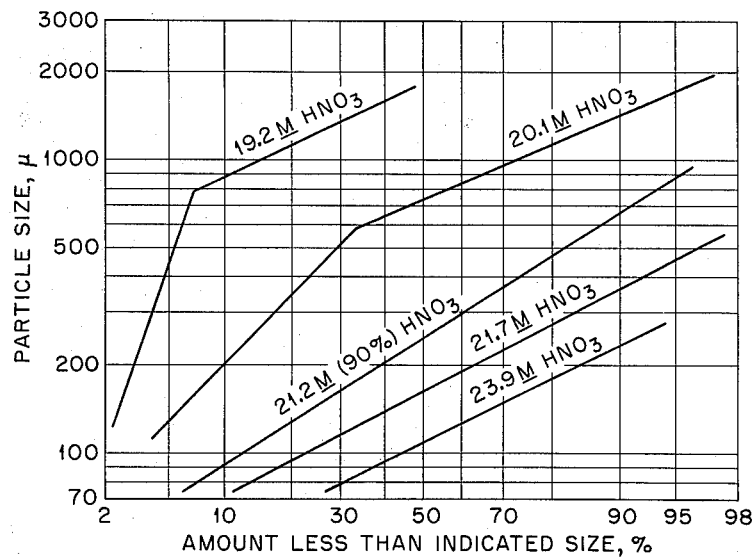
Figure 3:
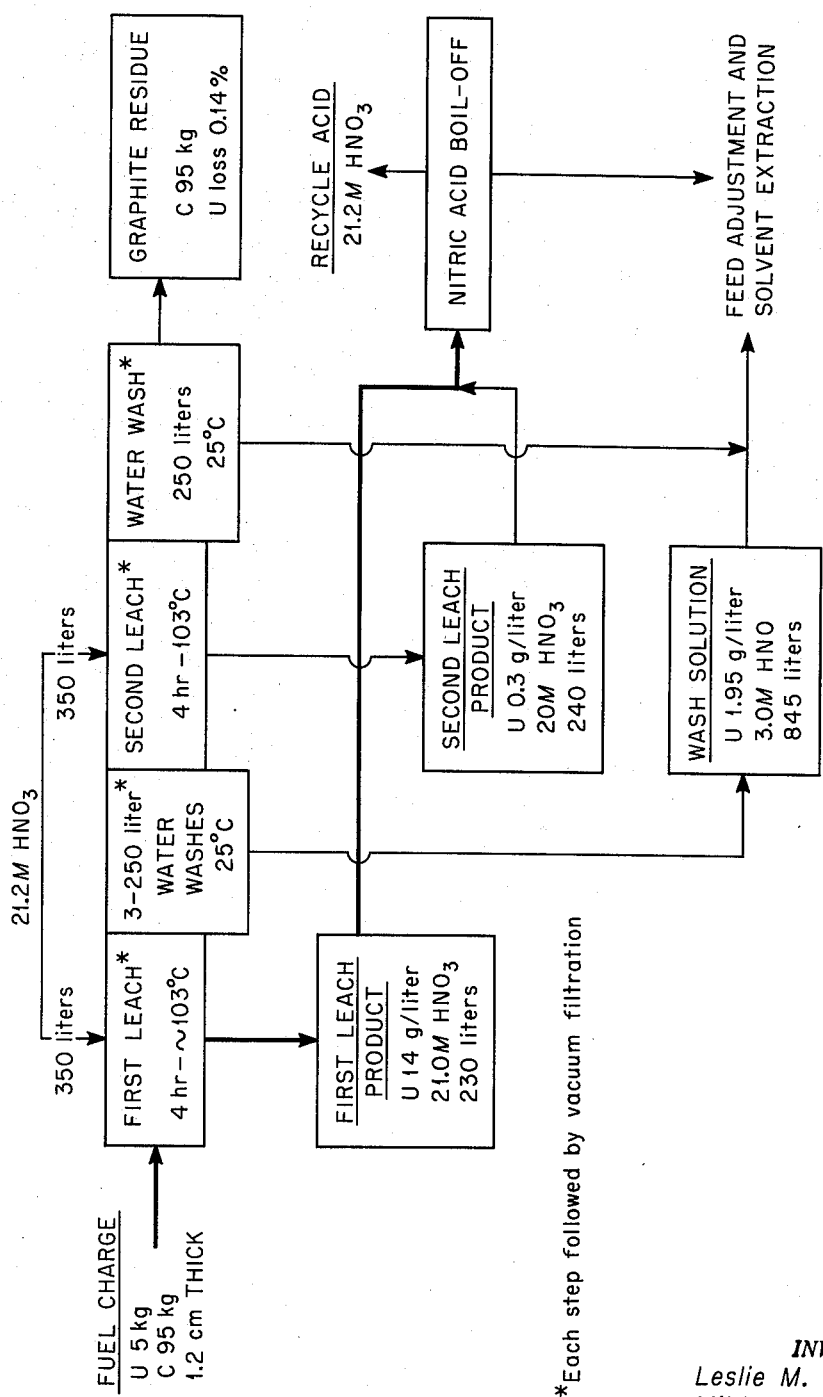

The particle size distribution data correlated by probability plots as shown in FIGS. 1 and 2 were obtained by the statistical techniques developed in "Small Particle Statistics" by G. Herdon, Elsevier Publishing Company, New York, 1953. The mean (50%) size obtained from such plots is the geometric mean as shown in FIG. 2.

It should be understood that while specific embodiments of our invention have been described, many modifications and variations thereof can be made within the scope of this invention and will readily occur to those skilled in the art.

Having thus described our invention, we claim:

1. A process for dissolving uranium from a graphite-uranium compact having a minimum dimension of 1000 microns which comprises contacting said compact with at least a 20 M aqueous solution of nitric acid to thereby disintegrate the graphite and form a solution of uranyl nitrate.

2. A process for recovering uranium from a nuclear fuel element having a minimum dimension of 1000 microns, said element comprising a graphite matrix and a uranium compound dispersed therein which comprises contacting said fuel with at least a 20 M aqueous solution of nitric acid at a temperature in the range 25° C. to the boiling point of said solution to thereby disintegrate the graphite to a powdered mass and form a uranyl nitrate solution.

3. A process for recovering uranium from a compact having a minimum dimension of 1000 microns, said compact containing a graphite matrix and a uranium compound dispersed therein which comprises contacting said fuel with at least a 20 M aqueous solution of nitric acid at a temperature in the range 25° C. to the boiling point of said solution to thereby disintegrate the graphite to a powdered mass and form a uranyl nitrate solution, separating the thus formed solution and then mixing the graphite powdered mass with an aqueous leachant to effect solution of residual uranium values, separating the aqueous leachant and combining it with the aforementioned uranyl nitrate solution to form a final solution containing virtually all of the uranium in said fuel.

4. A process of disintegrating a pressed and sintered nuclear fuel compact having a minimum dimension of 1000 microns consisting of a refractory uranium compound dispersed in a matrix of graphite, without mechanical grinding, and simultaneously converting the uranium therein to uranyl nitrate which comprises immersing said compact in an aqueous solution of nitric acid having a strength of at least 20 M.

References Cited by the Examiner

"Reactor Fuel Processing," vol. 3, No. 4, pp. 13–14, October 1960.

U.S.A.E.C. Report ORNL–2761, pp. 4–17, April 1, 1960.

REUBEN EPSTEIN, *Primary Examiner*.